Sept. 7, 1954

G. K. SCHUMAKER 2,688,490

RECORD STACKING MEANS

Filed Dec. 4, 1950

Inventor

GEORGE K. SCHUMAKER

By Mitchell & Bechert

Attorneys

Patented Sept. 7, 1954 2,688,490

UNITED STATES PATENT OFFICE 2,688,490

RECORD STACKING MEANS

George K. Schumaker, Glen Ridge, N. J.

Application December 4, 1950, Serial No. 199,115

11 Claims. (Cl. 274—1)

My invention relates to improved stacking means for phonograph records or the like.

It is an object to provide stacking means which may inherently permit single-handed placement and removal of a plurality of records.

It is a further object to provide improved indicating means for indicating a desired-size stack of records in a device of the character indicated.

It is also an object to meet the above objects with a construction adaptable not only to the stationary storage of one or more stacks of phonograph records, but also to the more ready accommodation of a stack of records on an automatic-phonograph record player.

It is a general object to meet the above objects with a simple construction that is easy to use and inexpensive to manufacture and which may promote the better handling and therefore the longer life of the records accommodated thereon.

Other objects and various further features of the invention will be pointed out or will occur to those skilled in the art from a reading of the following specification in conjunction with the accompanying drawings. In said drawings, which show, for illustrative purposes only, preferred forms of the invention:

Figure 4:
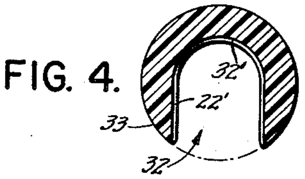
Figure 5:
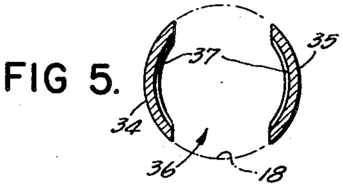
Figure 6:
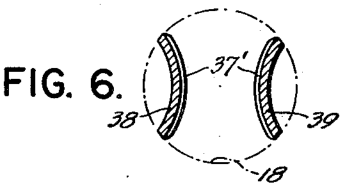
Figure 7A:
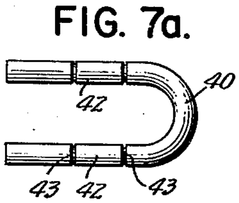
Figure 7:
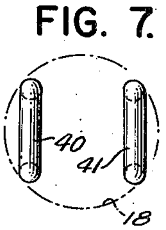
Figure 8:
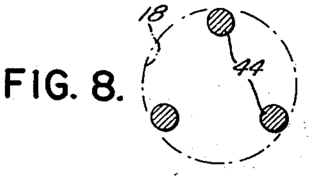
Figure 9:
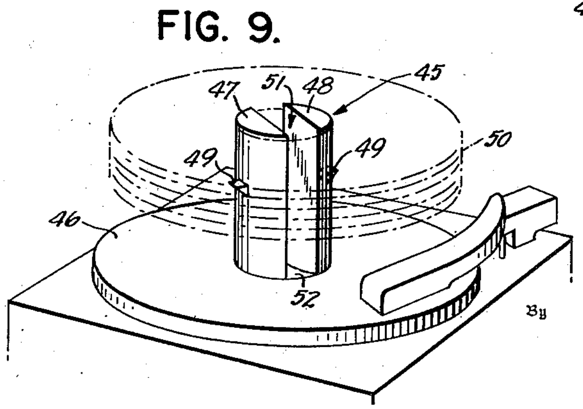

Figs. 4, 5, and 6 are sectional views of alternative spindle constructions;

Fig. 7 is a plan view of a further-modified spindle construction;

Fig. 7a is a side elevation of one part of the construction of Fig. 7;

Fig. 8 is a sectional view, similar to those of Figs. 3 to 6, but showing a further arrangement; and Fig. 9 is a simplified view in perspective of a phonograph player incorporating features of my invention.

Briefly stated, my invention contemplates improved means for the stacking of phonograph records whether on an automatic player or on a stationary storage facility, all with a view to improvement of the ease of handling the records. My invention is of particular application to the storage and handling of records having enlarged central openings, as for example the so-called 45-R. P. M. records. These records may be said to have an inner rim (at the opening) and an outer rim, so that they may be readily grasped single-handed by pinching between one finger at one rim and another finger at the other rim. In conventional players for such records, the enlarged spindle (which must accommodate the enlarged record opening) is circumferentially continuous so that, once the record has been placed on the spindle, one must, in order to remove the record, either take two hands applied at diametrically opposite points on the outer rim, or pinch the record (to the damage of the record).

In accordance with my invention, the spindle or other means for locating stacked records is provided with a finger-access groove or opening sufficiently longitudinally extensive with respect to the spindle axis that, with records stacked on the spindle, one finger may be thrust within the record bores (inner ring), while another finger of the same hand is applied to the outer rims of the desired number of records in the stack. It then will be possible to removal all records in the stack with one hand. The locating means may comprise upwardly extending means to engage the outer rims of records, and the finger-access opening therein may be an axially extending slot in the periphery; however, in the forms shown, the locating means engages the inner rims. The spindle or other means of locating support for the records may assume a number of different forms, some of which will be described in detail; I shall also describe means incorporated in the locating means for readily determining the necessary number of records to withdraw from a large stack of records in order to play a desired number of selections.

Figure 1:
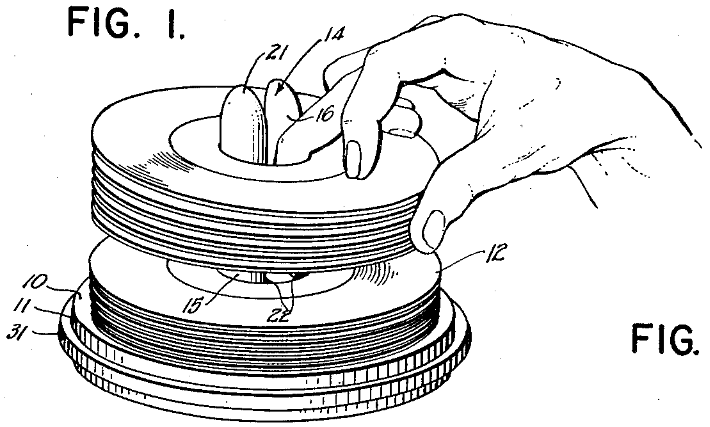
Fig. 1 is a view in perspective of a record-stacking device incorporating features of the invention and shown at a time when a first of two stacks of records is being removed from the spindle in a single-handed operation.
Figure 2:
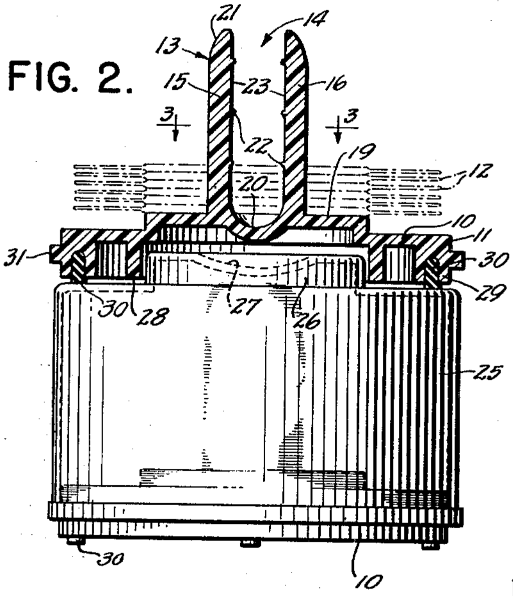
Fig. 2 is a side elevation, partly in vertical section, showing details of the stacking device and the nesting of a plurality of such stacking devices.
Figure 3:
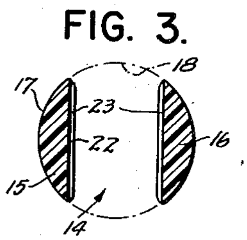
Fig. 3 is an enlarged section of the spindle of Fig. 2, as viewed in the plane 3—3 of Fig. 2.

Referring to Figs. 1, 2, and 3 of the drawings, my invention is shown in application to a stationary record-stacking device, comprising a base member 10 of circular configuration and having an outer ledge 11 of diameter slightly in excess of the record diameter to be accommodated in the stacking device. The device may include a central upwardly projecting stud or spindle for locating enlarged bores of records 12 in a stack, and in the form shown the spindle means 13 is integrally cast in one piece with the base member 10. As indicated generally above, the spindle means preferably includs a finger-access groove or opening 14; the groove 14 is shown to extend diametrically of the spindle means 13 and to be defined between two upstanding members 15—16.

The members 15—16 may be arcuately formed on the outer surface, as at 17, with a curvature corresponding to the bore 18 of the record, and the spacing between members 15—16 (defining the opening 14) may be sufficiently wide for generous finger accommodation. For ease of initial location of the record openings upon the spindle means 13, the upper projecting ends 21 of the members 15—16 may be tapered or inclined toward the spindle axis and rounded off, as shown.

For protection of the delicate grooves on the records, I prefer that the records shall be supported on an annular surface 19 around the base of the spindle means 13 and slightly raised above the main part of the base 10. By placing the surface 19 above the main body 10 in this manner, it is possible to provide for extension of the finger-access opening or groove 14 below the plane of the supporting surface 19, as indicated generally at the recessed portion 20. The record-supporting part of the base member 10 preferably provides at least three angularly spaced points of support about the spindle means 13, so that a record may be uniquely supported in a given preferably horizontal plane; in the form shown, these three points are included in the flat circumferentially continuous surface 19.

In use, a plurality of records may be grasped with the thumb and middle finger of the hand, as shown in Fig. 1, and without removing one's grip on the records the entire stack may be carefully lowered into properly supported position upon my stacking device, the bottom record resting upon the raised supporting surface 19. A large number of records may be accommodated in this manner, and the number so accommodated may be several times the playing capacity of the record player. To facilitate removal of a given desired number of records from my stacking device, I provide indicator means within the access opening 14 so that the inserted finger may sense a proper depth, corresponding to a desired number of records to be played. In the form shown, the indicator means comprises a plurality of chordwise-extending ridges 22 molded integrally in the parallel opposed faces 23 defining the opening 14. These indicator ridges may be placed at heights above the supporting surface 19 corresponding to the desired number of records to be selected at any one time; as shown, the indicators 22 identify groups of six records. Thus, when removing a selection of records from the stacking means of the invention, one may readily sense from the finger that is inserted in the opening 14 just how far the finger must be inserted in order to remove exactly the number of records to be played.

For maximum protection of the records while stored in my stacking device, I provide covering means 25 adaptable to stacking with another similar stacking device. The covering means 25 may be generally cylindrical, as shown in Fig. 2, and with a closed top having a raised central portion 26, in which a recessed handle grip 27 is formed for convenience in handling. The sides of the raised portion 26 may register, with suitable radial clearance, with a downwardly extending internal skirt 28 formed in the base member 10, so that one base member 10 may be mounted upon the covering member 25 of another stacking device, with minimum danger of upsetting a stack of stacking devices. For a quiet manipulation, and to protect against marring, the outer skirt 29 of each base member 10 may carry a plurality of angularly spaced resilient toes or feet 30, as will be understood.

In the usual single-handed grip of a stack of records, the middle finger may project slightly below the plane of the bottom record, in order to probe for the spindle center when placing the records on a player. In accordance with the invention, such probing may be assisted by provision of an upwardly facing finger-locating recess in the top of an otherwise "solid" spindle and concentric with the spindle axis. In Fig. 4, I provide such an opening in conjunction with the lateral access opening 32, the inner curve 32′ being preferably concentric with the spindle axis, and the outer surface 33 being almost circumferentially continuous. Such a construction may provide ready initial finger location and improved structural rigidity, at a sacrifice of one direction of finger access. If desired, marking means, such as the ridge 22′ on the wall of groove 32, may identify a desired number of stacked records.

In the spindle of Fig. 5, two cylindrical arcuate sheet-metal strips 34—35 are placed diametrically opposite each other and are spaced apart to define the finger-access opening 36, which, like the opening 14 of Fig. 3, is accessible from opposite sides of the spindle. Marker ridges 37 may be stamped as small ribs at appropriate heights in the concave portions of members 34—35, and stack-counting may be facilitated in the manner discussed above.

In Fig 6, spindle support is provided by two spaced cylindrically arcuate members 38—39 with their convex surfaces facing each other. The limits of these surfaces are preferably tangent to the circle defining the standard bore size 18 for the records to be supported. As in Fig. 5, marker ridges 37′ may be stamped at the proper heights in members 38—39.

In Figs. 7 and 7*a*, two upstanding U-shaped members 40—41 define the spindle, and the outer limits of the legs 42 of these members are preferably tangent to the standard bore circle 18 of the records. For purposes of indicating a proper stack height for each record selection, I have provided spaced peripheral grooves 43 in each leg 42 of the members 40—41.

In Fig. 8, the spindle means is defined merely by three upstanding bars or rods angularly spaced about the spindle axis but tangent at their outer limits to the bore 18 of the records. Such a configuration will be seen to provide three commodious finger-access openings.

Although the above discussion has been directed principally to a stationary record-stacking device, it is to be understood that the principles of the invention are equally applicable to the record player itself, as shown in the simplified diagram of Fig. 9. In Fig. 9, spindle means 45 is supported centrally of a turntable 46. The spindle means shown is of the general configuration exemplified in Figs. 1, 2, and 3, wherein two spaced chordwise members 47—48 permit finger access in the space between them. Each of the spaced members 47—48 may carry lug means 49 effectively located in a single radial plane, spaced conveniently above the plane of the turntable 46 and below the upper projecting end of the spindle means 45 in order to support a given stack of records 50 in readiness for playing. The lugs 49 may be actuated inwardly by known mechanism, so as serially to drop the lowermost record onto the turntable 46, for playing in an automatic sequence. As in the case of the other described forms, the finger-access opening 51 may be at least as longitudinally extensive as is the spindle means 45, and the bottom of the access opening 51 may terminate in a concave recess 52 beneath the plane of the turntable 46. With the described structure, all records of a given stack may be readily removed in a single handed operation, by inserting a finger into the access opening 51; concurrently, the records of another stack to be played may be grasped in the fingers of the other hand and placed directly upon the player to rest upon the lugs 49 in readiness for playing.

It will be appreciated that I have described a relatively simple means for stacking phonograph records so as to facilitate the handling of the records, and with greater protection to their delicate recording grooves. With my arrangement, it is never necessary to use more than one hand in the manipulation of a given selection of recordings, and one selection may be replaced by another on the record player or on the stacking means, merely by using one hand for one collection of records and the other hand for a second collection of records. Also record selections of desired number may be readily picked from a larger stack as the inserted finger responds to touching the walls or other confines of the access opening.

While I have described my invention in detail for the preferred forms shown, it will be understood that various changes may be made within the scope of the invention as defined in the appended claims.

I claim:

1. In a record-stacking device of the character indicated, for accommodating a stack of records having enlarged central openings therein, so that such records may be said to have an inner rim and an outer rim for a single-handed finger-grip between said rims, a base with at least three angularly spaced points of support for uniquely supporting a record in a given generally horizontal plane, and upstanding locating means having a locating axis fixedly oriented generally vertically of said plane, said locating means including at sections near said base and about said axis at least three limiting points substantially on a circle of the inner-rim radius about said axis, and said locating means having an elongated finger-access opening between two of said limiting points and of a depth extending below said generally horizontal plane.

2. A device according to claim 1, in which said upstanding locating means comprises two spaced members angularly spaced by an amount sufficient to permit finger insertion between said members.

3. A device according to claim 2, in which each of said members is arcuately formed on the outside to conform with the curvature of standard record openings, and in which the inner opposed surfaces of said members are substantially flat and parallel.

4. A device according to claim 2, in which the outer surfaces of said members are arcuately formed in accordance with the curvature of a standard record opening, and in which the inner opposite faces are concave.

5. A device according to claim 2, in which each of said members comprises an inverted generally U-shaped member with the outer limits of the legs thereof substantially tangent to a circle defining the bore of a standard record opening.

6. A device according to claim 1, in which said upstanding locating means comprises at least three substantially parallel upwardly projecting bar members spaced about the axis of said upstanding locating means and having outer limits substantially tangent to a circle defining the standard bore opening of a record.

7. A device according to claim 1, in which said three points of support lie in a flat surface extending circumferentially of the circle defined by said locating points.

8. A device according to claim 1, in which an inwardly facing surface of said locating means at said finger-access opening is characterized by surface discontinuities at vertically spaced locations corresponding in spacing to a desired multiple of a standard record thickness above said horizontal plane.

9. A device according to claim 1, in which said base and locating means are non-rotatably connected to each other.

10. A device according to claim 1, in which said base and locating means are relatively rotatable.

11. A device according to claim 1, in which said base is rotatable, and in which supporting-abutment means project from said locating means beyond the inner-rim radius and effectively at a radial plane intermediate the ends of said locating means.

References Cited in the file of this patent

UNITED STATES PATENTS

| Number | Name | Date |
|---|---|---|
| 487,438 | Wallace | Dec. 6, 1892 |
| 927,379 | Points | July 6, 1909 |
| 1,311,450 | Laraway | July 29, 1919 |
| 1,504,421 | Bishop | Aug. 12, 1924 |
| 1,508,239 | O'Brien | Sept. 9, 1924 |
| 1,568,130 | Blackwell | Jan. 5, 1926 |
| 1,973,449 | Tighe | Sept. 11, 1934 |
| 2,245,133 | Hopkins | June 10, 1941 |
| 2,530,609 | Friedman | Nov. 21, 1950 |

FOREIGN PATENTS

| Number | Country | Date |
|---|---|---|
| 482,667 | Great Britain | Apr. 4, 1938 |